(12) United States Patent
Chih-Hsiung

(10) Patent No.: US 6,332,694 B1
(45) Date of Patent: Dec. 25, 2001

(54) LASER PROJECTION DEVICE FOR PROJECTING ORTHOGONAL LASER-LINES

(76) Inventor: Lin Chih-Hsiung, IF, No.143, Chun Shaug St., Chung Ho City, Taipei Hsien (TW)

(*) Notice: Subject to any disclaimer, the term of this patent is extended or adjusted under 35 U.S.C. 154(b) by 0 days.

(21) Appl. No.: 09/512,462

(22) Filed: Feb. 24, 2000

(51) Int. Cl.[7] .............................. F21K 27/00; F41G 1/32
(52) U.S. Cl. ............................................. 362/259; 33/241
(58) Field of Search ................................. 362/259; 33/241

(56) References Cited

U.S. PATENT DOCUMENTS

| | | | | |
|---|---|---|---|---|
| 3,823,313 | * | 7/1974 | Unema | 240/2 R |
| 5,967,645 | * | 10/1999 | Anderson | 362/259 |
| 6,183,129 | * | 2/2001 | Aoyama et al. | 374/121 |
| 6,199,286 | * | 3/2001 | Reed, Jr. et al. | 33/265 |

* cited by examiner

Primary Examiner—Sandra O'Shea
Assistant Examiner—Ronald E. DelGizzi
(74) Attorney, Agent, or Firm—Dougherty & Troxell

(57) ABSTRACT

A laser projection device with multiple functions comprises a casing, a locating leg and two support legs associated with the lower end of the casing respectively, a transverse bar provided in the casing, a heavy weight pivotally engaging with the transverse bar, and a vertical laser line indicating module and a horizontal laser point indicating module fitting with the heavy weight respectively. The vertical laser line indicating module emits a vertical indicating line and the horizontal laser point indicating module emits indicating points. The vertical indicating line and the horizontal indicating line are orthogonal to each other, and the tip of the locating leg is right on a vertical plane of light and right under the horizontal indicating line.

10 Claims, 4 Drawing Sheets

LASER PROJECTION DEVICE FOR PROJECTING ORTHOGONAL LASER-LINES

BACKGROUND OF THE INVENTION

1. Field of the Invention

The present invention relates to a laser projection device with multiple functions for measurement, and particularly to a laser projection device with multiple functions, with which two lines perpendicular to each other can be defined at any point by way of the laser rays.

2. Description of Related Art

Usually, two lines perpendicular to each other at any point on a plane of working are needed frequently in the construction works such as a building, a bridge, a tunnel, and etc. A prior art shown in Taiwanese Patent Publication No. 323787 has disclosed a laser projection device that can emit a vertical laser indicating line and a horizontal indicating line respectively. But it is not possible for the prior art device to set up two lines perpendicular to each other passing through any point on a plane.

SUMMARY OF THE INVENTION

An object of the present invention is to provide a laser projection device with multiple function, with which two lines perpendicular to each other can be defined at any point.

Another object of the present invention is to provide a laser projection device with multiple functions, which is easily constructed and is handily portable.

BRIEF DESCRIPTION OF THE DRAWINGS

The present invention can be more fully understood by referring to the following description and accompanying drawings, in which.

DETAILED DESCRIPTION OF THE PREFERRED EMBODIMENT

Figure 1:
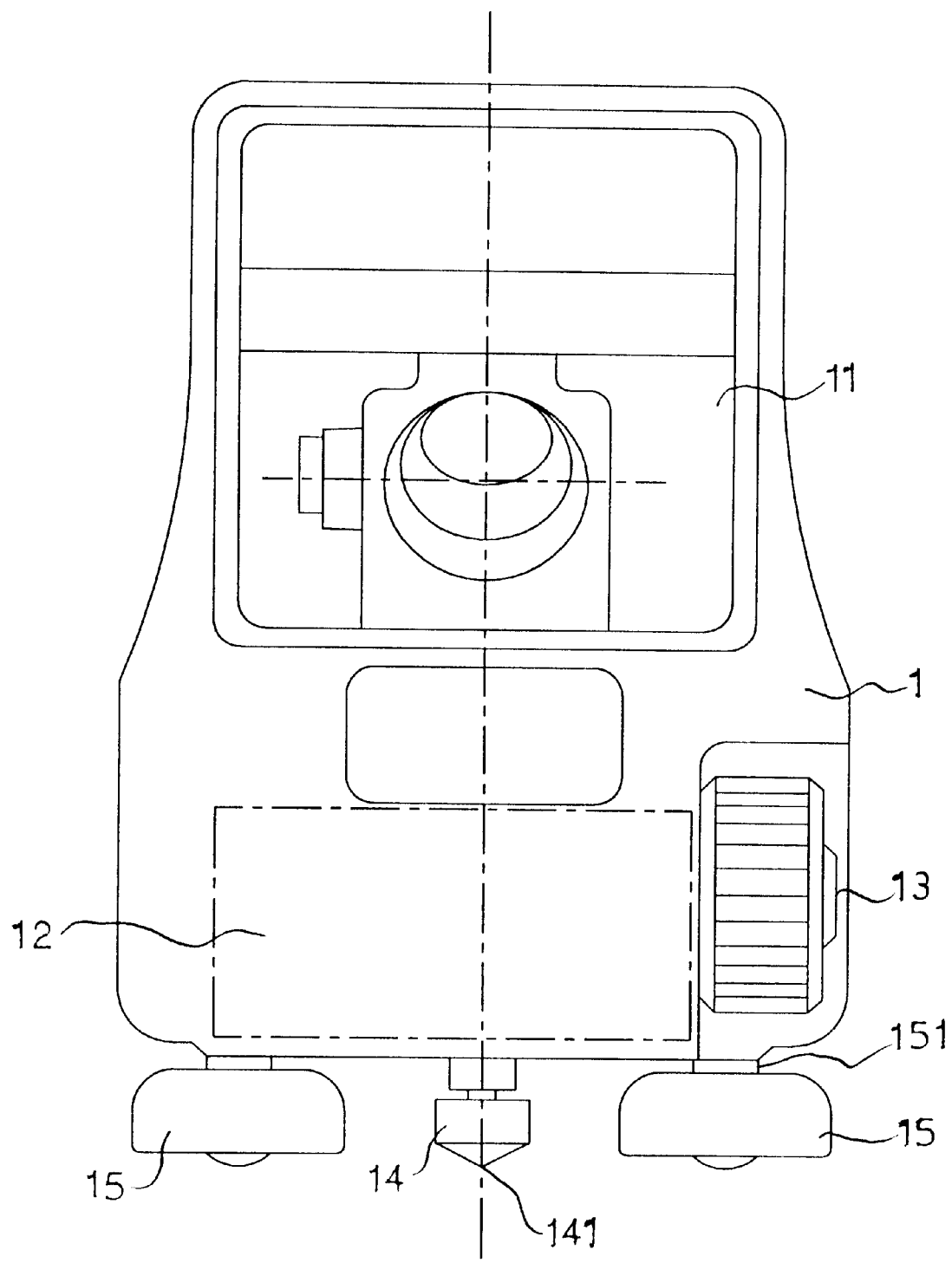
FIG. 1 is a front view of a laser projection device with multiple functions in accordance with the present invention
Figure 2:
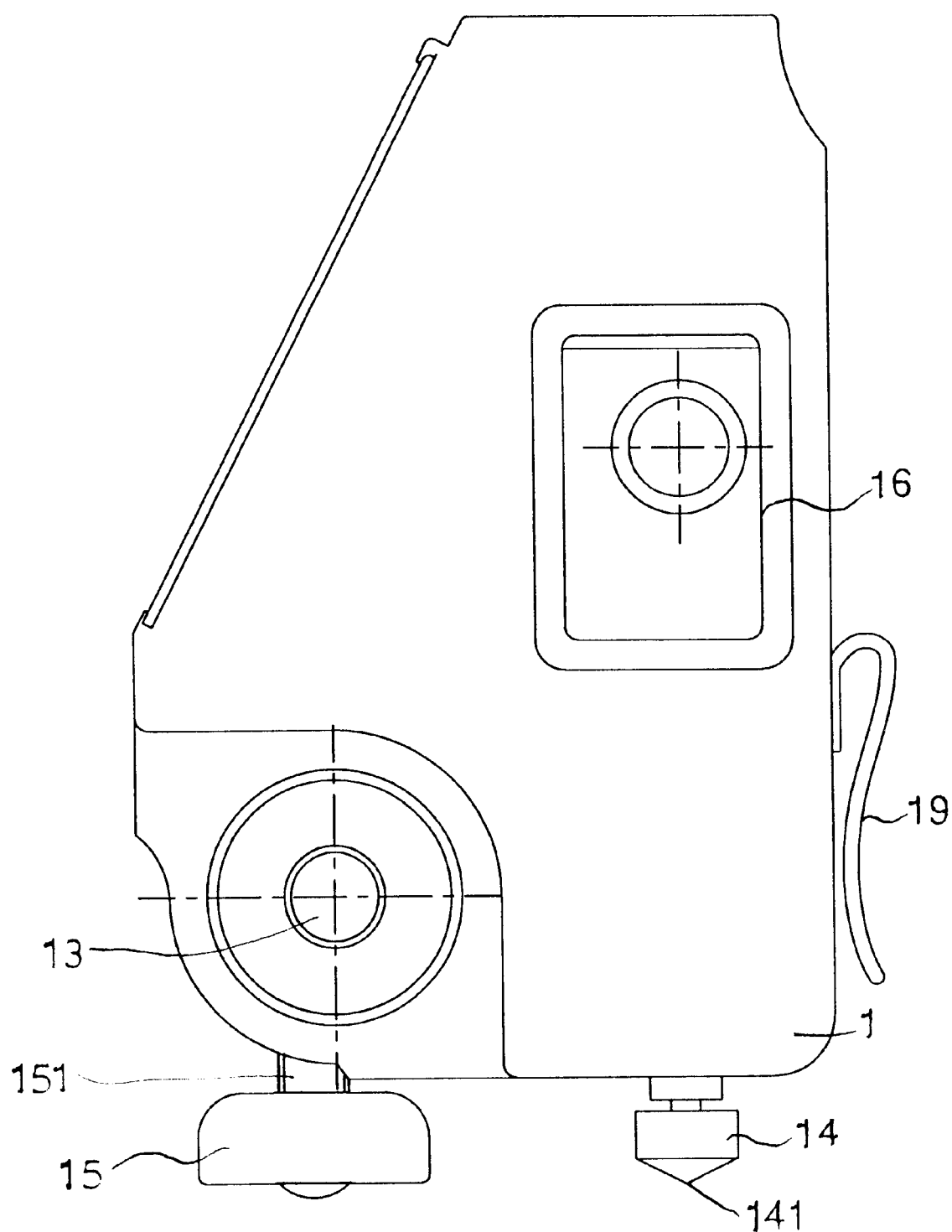
FIG. 2 is a side view of a laser projection device with multiple functions in accordance with the present invention.

Referring to FIGS. 1 and 2, a laser projection device with multiple functions according to the present invention has a casing 1, and a vertical projection window 11 is at the front end of the casing 1. A battery set 12 with switch 13 is in the casing 1 at lower part thereof. A locating leg 14 is under the casing 1 at the rear part thereof and support legs 15 are under the casing at the front part thereof. The support legs 15 each fastens to a stud 151 respectively so as to be adjusted the position thereof upward and downward. The lower end of the locating leg 14 is inverse conical and the tip 141 thereof can contact a working plane to be measured. A horizontal point projecting window 16 is located at a lateral side of the casing 1.

Figure 3:
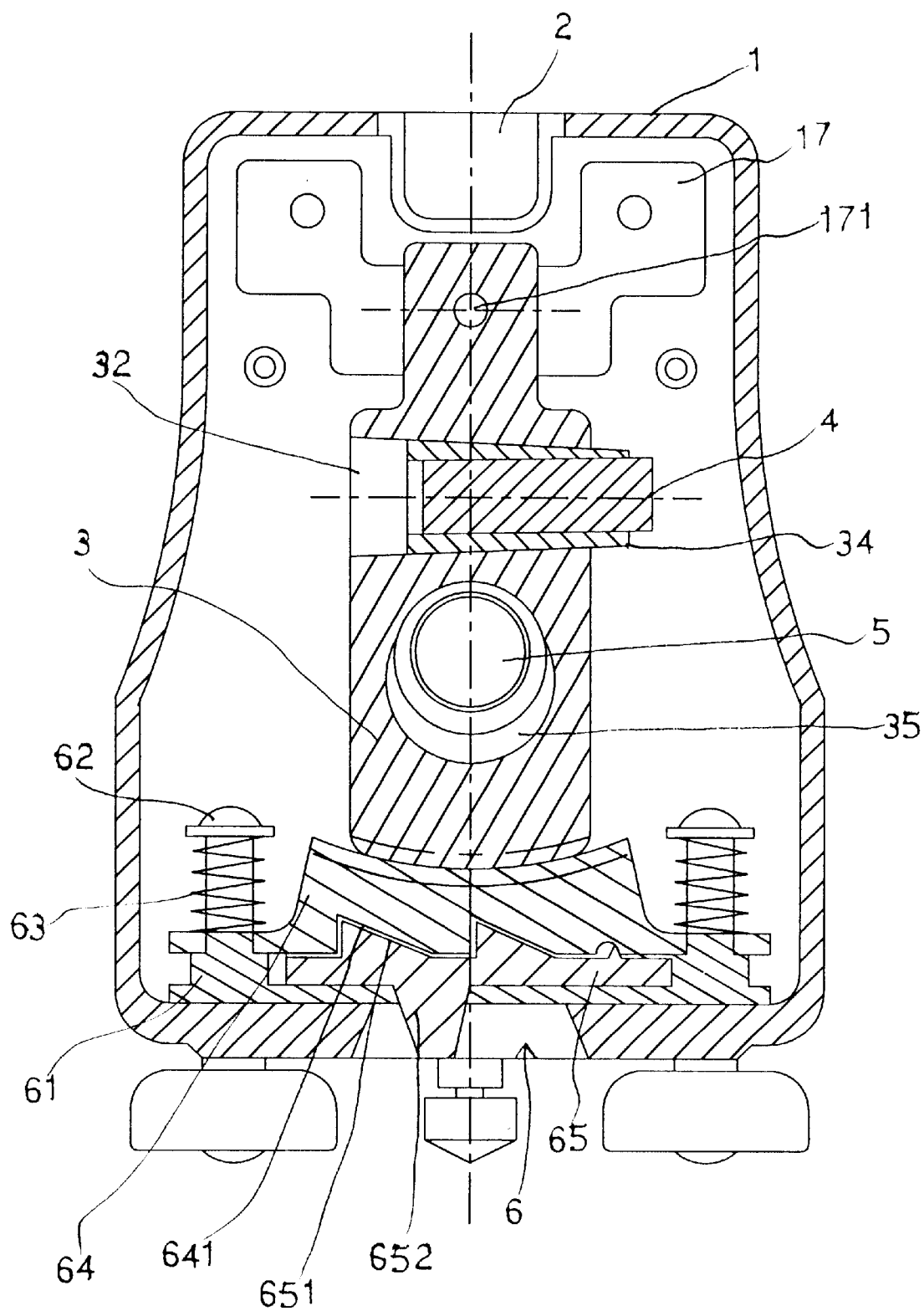
FIG. 3 is a sectional view of FIG. 1.
Figure 4:
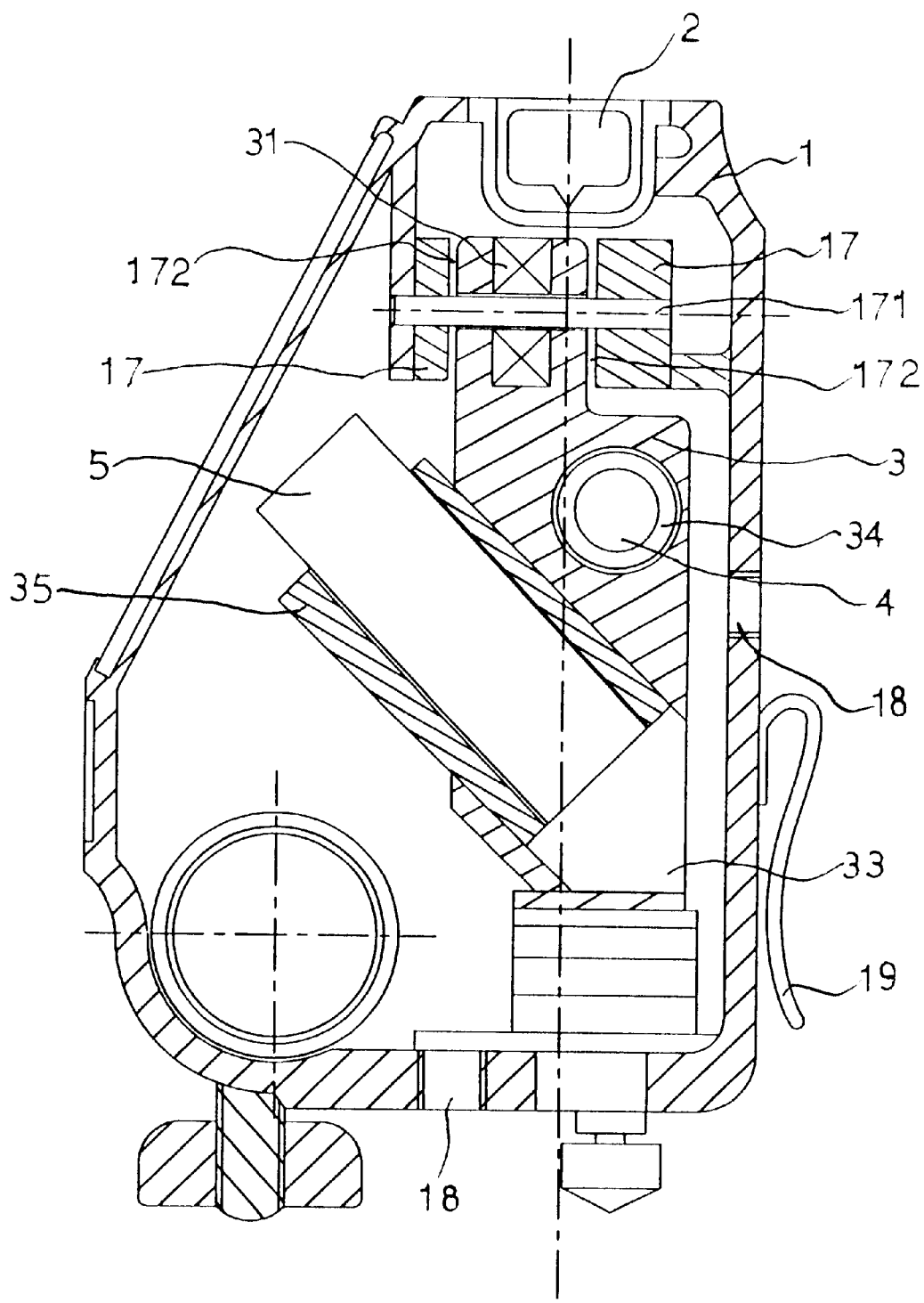
FIG. 4 is a sectional view of FIG. 2.

Referring to FIGS. 3 and 4, an air level 2 is disposed on the casing 1 at the top thereof and carriages 17 are provided on the casing 1 at the top thereof either to support a transverse bar 171. A heavy weight 3 at the upper end thereof pivotally engages the transverse bar 171 with a pivot 31 and at the lower end provides a first hole 32 and a second hole 33. The first hole 32 and the second hole 33 fit with a first taper sleeve 34 and a second taper sleeve 35 respectively. The first taper sleeve 34 and the second taper sleeve 35 further fit with a laser module 4 of horizontal point and a laser module 5 of vertical line respectively. A respective gap 172 between the transverse bars 171 and the heavy weight 3 is coated with damper glue to allow the heavy weight 3 moving back to the balanced position swiftly after a displacement. A brake 6 is in the casing 1 and a bottom plate 61 is associated with the lower end thereof. The bottom plate 61 at both lateral sides extends a short post 62 respectively and a press plate 64 fits with the posts 62. A spring 63 is provided on the respective short post 62 to press against the press plate 64 at the upper surface thereof. The bottom of the press plate 64 has an inclined side 641 and a push plate 65 has a push wall 651 with an inclined side corresponding to the inclined side 641. The push wall 651 is under the press plate 64 and the inclined side of the push wall 651 contacts with the inclined side 641. The push plate 65 has a push part 652 extending out of the bottom plate 61 and lower end of the casing 1. When the push part 652 is moved toward the right side of FIG. 3, the push wall 651 then moves upward to displace the press plate 64. Thus, the upper surface of the press plate 64 can contact with the bottom of the heavy weight 3 to prevent the heavy weight 3 from swinging left and right for an easy storage. While in operation, the push part 652 is pushed leftward and a higher spot on the push wall 651 moves toward a higher spot on the inclined side 641. Thus, the springs 63 are biased to move the push plate 64 downward such that the heavy weight 3 at the bottom part thereof separates from the upper surface of the push plate 64 to freely perform a job of locating. The casing 1 at the rear part and the bottom part provided with threaded holes 18 respectively available for fastening to a tripod. Also, the casing 1 at the rear part thereof is provided with a hook hanger 19, which can be used to hang on the girdle of an user handily for easily carrying the laser device.

Because the heavy weight 3 pivotally engages with the transverse bar 171, it is possible for the heavy weight 171 to be displaced for a position compensation such that the heavy weight 3 can maintain a downward position without offset. Checking the air level 2 with adjusting the two support legs 15 is possible for the laser projection device to be in a state of horizontal alignment. The vertical laser line indicating module 5 can emit a vertical indicating line perpendicular to a horizontal plane through the vertical projection window 11 and the horizontal laser point indicating module 4 can be operated to emit a horizontal indicating point through a horizontal point window 16. A horizontal indicating line formed by the horizontal indicating point is orthogonal to the vertical indicating line. The tip 141 on the locating leg 14 is disposed right on a vertical light plane constituted by the vertical indicating line and right under the horizontal indicating line the horizontal indicating point.

An operating way for two perpendicular straight lines passing any point is described further hereinafter. The tip 141 on the locating leg is placed on any point, then the vertical laser line indicating module 5 can emit a vertical indicating line on the working plane or a wall surface in front thereof and an extending line of the vertical indicating line passes the tip 141. Meanwhile, the horizontal laser point indicating module can emit a horizontal indicating point on a wall surface in front thereof. In this way, the vertical indicating line and the horizontal point is marked on the working plane and the two wall surfaces respectively. Then, the laser projection device is turned and the tip 141 is still on the point to allow the horizontal indicating point aiming the vertical indicating line marked on the original wall surface. Thus, the laser vertical line module 5 can emit another line perpendicular to the original vertical indicating line on the working plane. Therefore, two lines perpendicular to each other passing any point can be marked.

It is noted that the present invention can mark two lines perpendicular to each other passing through any point and the vertical indicating line of the present invention can mark a straight line on the floor, on the wall, and the stair way. Furthermore, it is appreciated that the present invention can mark horizontal indicating points on any wall surface and connecting two horizontal indicating points can form a horizontal line. Hence, the present invention is simple in structure and handy for carry, and in addition, a variety of functions can be obtained for a marking job regarding laser lays.

While the present invention has been described with reference to preferred embodiments thereof, it is to be understood that modifications and variations may be easily made without departing from the spirit of this invention, which is defined by the appended claim.

What is claimed is:

1. A laser projection device with multiple functions, comprising:
    a casing with a lower end and an upper end, and having two studs extending outwardly from the lower end;
    a locating leg, having a tip, and extending from the casing on said lower end thereof;
    two support legs, supporting the lower end of said casing;
    a transverse bar, provided in the casing;
    a weight with a first hole and a second hole therein, the weight pivotally engaging the transverse bar;
    a vertical laser-line indicating module, located in the first hole in the weight; and
    a horizontal laser point indicating module, located in the second hole in the weight;
    such that said vertical laser-line indicating module emits a vertical indicating-line, said horizontal laser point indicating module emits indicating points to constitute a horizontal indicating-line, the vertical indicating-line and the horizontal indicating-line are orthogonal to each other, and the tip of said locating leg is on a vertical plane of light and under the horizontal indicating line.

2. The laser projection device with multiple functions as defined in claim 1, further comprising an air level located at the upper end of said casing.

3. The laser projection device with multiple functions as defined in claim 1, further comprising a brake located at the lower end of the casing making contact with a lower part of the weight so as to prevent the weight from swinging.

4. The laser projection device with multiple functions as defined in claim 1, wherein said two support legs are adjustable in height.

5. The laser projection device with multiple functions as defined in claim 1, wherein said two support legs are engaged with said two studs respectively.

6. The laser projection device with multiple functions as defined in claim 3, wherein the brake comprises a bottom plate adjacent to the lower end of the casing, two short posts extending from said bottom plate, each short post being provided with a spring pressing on a press plate having an oblique side provided at a lower edge thereof, a push plate with an oblique push wall contacting the oblique side on the press plate the push plate having a push part extending downwardly through the bottom plate and out of the lower end of the casing respectively.

7. The laser projection device with multiple functions as defined in claim 1, wherein the locating leg is inversely conical.

8. The laser projection device with multiple functions as defined in claim 1, further comprising a first taper sleeve fitted between the first hole and the vertical laser-line indicating module and a second taper sleeve fitted between the second hole and the laser-point indicating module.

9. The laser projection device with multiple functions as defined in claim 1, wherein the casing at a lower rear part thereof has threaded holes, and a hook hanger located at the lower rear part.

10. The laser projection device with multiple functions as defined in claim 1, further comprising carriages provided in the casing supporting the transverse bar with a gap between the carriages and the weight respectively, and a damper glue coated in the gap.

* * * * *